US011657277B2

(12) United States Patent
Chan et al.

(10) Patent No.: US 11,657,277 B2
(45) Date of Patent: May 23, 2023

(54) GENERATING NEURAL NETWORK OUTPUTS USING INSERTION COMMANDS

(71) Applicant: Google LLC, Mountain View, CA (US)

(72) Inventors: William Chan, Markham (CA); Mitchell Thomas Stern, Berkeley, CA (US); Nikita Kitaev, Berkeley, CA (US); Kelvin Gu, Mountain View, CA (US); Jakob D. Uszkoreit, Portola Valley, CA (US)

(73) Assignee: Google LLC, Mountain View, CA (US)

( * ) Notice: Subject to any disclaimer, the term of this patent is extended or adjusted under 35 U.S.C. 154(b) by 338 days.

(21) Appl. No.: 16/883,772

(22) Filed: May 26, 2020

(65) Prior Publication Data

US 2020/0372356 A1 Nov. 26, 2020

Related U.S. Application Data

(60) Provisional application No. 62/852,301, filed on May 23, 2019.

(51) Int. Cl.
*G10L 25/00* (2013.01)
*G10L 21/00* (2013.01)
(Continued)

(52) U.S. Cl.
CPC ............. *G06N 3/08* (2013.01); *G06F 40/237* (2020.01); *G06N 3/04* (2013.01); *G06N 3/084* (2013.01)

(58) Field of Classification Search
CPC .................................. G06F 40/44; G06F 40/45
See application file for complete search history.

(56) References Cited

U.S. PATENT DOCUMENTS

| 10,963,779 | B2 * | 3/2021 | Le ........................ G06N 3/0445 |
| 2009/0248394 | A1 * | 10/2009 | Sarikaya ................. G06F 40/44 704/4 |
| 2016/0085748 | A1 * | 3/2016 | Goto ....................... G06F 40/44 704/4 |

FOREIGN PATENT DOCUMENTS

| CA | 3038812 A1 * | 5/2018 | ........... G06N 3/0445 |
| CN | 108021560 B * | 4/2021 | ............. G06F 40/45 |

(Continued)

OTHER PUBLICATIONS

Bahdanau et al., "Neural Machine Translation by Jointly Learning to Align and Translate", ICLR, Sep. 2014, 15 pages.
(Continued)

*Primary Examiner* — Shreyans A Patel
(74) *Attorney, Agent, or Firm* — Fish & Richardson P.C.

(57) ABSTRACT

Methods, systems, and apparatus, including computer programs encoded on computer storage media, for performing sequence modeling tasks using insertions. One of the methods includes receiving a system input that includes one or more source elements from a source sequence and zero or more target elements from a target sequence, wherein each source element is selected from a vocabulary of source elements and wherein each target element is selected from a vocabulary of target elements; generating a partial concatenated sequence that includes the one or more source elements from the source sequence and the zero or more target elements from the target sequence, wherein the source and target elements arranged in the partial concatenated sequence according to a combined order; and generating a final concatenated sequence that includes a finalized source sequence and a finalized target sequence, wherein the finalized target sequence includes one or more target elements.

24 Claims, 4 Drawing Sheets

(51) Int. Cl.
G06F 40/30 (2020.01)
G06N 3/08 (2023.01)
G06F 40/237 (2020.01)
G06N 3/04 (2023.01)
G06N 3/084 (2023.01)

(56) References Cited

FOREIGN PATENT DOCUMENTS

WO  WO-2006116314 A2 * 11/2006 ......... G06F 17/2809
WO  WO 2018217948     11/2018

OTHER PUBLICATIONS

Bahdanau et al., "End-to-End Attention based Large Vocabulary Speech Recognition", IEEE International Conference on Acoustics, Speech and Signal Processing, Mar. 2016, 8 pages.

Chan et al., "Listen, Attend and Spell: A Neural Network for Large Vocabulary Conversational Speech Recognition", IEEE International Conference on Acoustics, Speech and Signal Processing, Mar. 2016, 16 pages.

Cho et al., "Learning Phrase Representations using RNN Encoder-Decoder for Statistical MachineTranslation", Empirical Methods in Natural Language Processing, Oct. 2014, pp. 1724-1734.

Demszky et al., "Transforming Question Answering Datasets Into Natural Language Inference Datasets", arXiv:1809.02922v2, Sep. 2018, 11 pages.

Chang et al., "BERT: Pre-training of Deep Bidirectional Transformers for Language Understanding", NAACL, May 2019, pp. 4171-4186.

Bradbury et al., "Non-Autoregressive Neural MachineTranslation", ICLR, Mar. 2018, 13 pages.

Hinton et al., "Distilling the Knowledge in a Neural Network", NIPS Deep Learning and Representation Learning Workshopm, Mar. 2015, 9 pages.

Kim et al., "Sequence-Level Knowledge Distillation", Empirical Methods in Natural Language Processing, Nov. 2016, pp. 1317-1327.

Lee et al., "Deterministic Non-Autoregressive Neural Sequence Modeling by Iterative Refinement", Empirical Methods in Natural Language Processing, Nov. 2018, pp. 1173-1182.

Luong et al., "Effective Approaches to Attention-based Neural Machine Translation", Empirical Methods in Natural Language Processing, Sep. 2015, pp. 1412-1421.

Oord et al., "WaveNet: A Generative Model for Raw Audio", arXiv:1609.03499, Sep. 2016, 15 pages.

Peters et al., "Deep contextualized word representations", NAACL, Jun. 2018, pp. 2227-2237.

Radford et al., "Improving Language Understanding by Generative Pre-Training", Semantic Scholar, 2018, 12 pages.

Radford et al., "Language Models are Unsupervised Multitask Learners", Semantic Scholar, 2019, 24 pages.

Rajpurkar et al., "SQuAD: 100,000+ Questions for Machine Comprehension of Text", Empirical Methods in Natural Language Processing, Nov. 2016, pp. 2383-2392.

Stern et al., "Insertion Transformer: Flexible Sequence Generation via Insertion Operations", ICML, Feb. 2019, 10 pages.

Stern et al., "Blockwise Parallel Decoding for Deep Autoregressive Models", NeurIPS, Nov. 2018, 10 pages.

Sun et al., "ERNIE: Enhanced Representation through Knowledge Integration", arXiv:1904.09223v1, Apr. 2019, 8 pages.

Sutskever et al., "Sequence to Sequence Learning with Neural Networks", NIPS, Dec. 2014, 2:3104-3112.

Vaswani et al., "Tensor2Tensor for Neural Machine Translation", AMTA, Mar. 2018, 1:193-199.

Vaswani et al., "Attention is all you need" NIPS, 2017, 11 pages.

Vinyals et al., "Show and Tell: A Neural Image Caption Generator" CVPR, 2015, 9 pages.

Wang et al., "GLUE: A multi-task benchmark and analysis platform for natural language understanding" ICLR, 2019, 20 pages.

Wang et al., "Tacotron: Towards End-to-End Speech Synthesis" arXiv, 2017, 10 pages.

Xu et al., "Show, Attend and Tell: Neural Image Caption Generation with Visual Attention" ICML, 2015, 22 pages.

U.S. Appl. No. 62/796,038, Uszkoreit et al., filed Jan. 23, 2019.

* cited by examiner

GENERATING NEURAL NETWORK OUTPUTS USING INSERTION COMMANDS

CROSS-REFERENCE TO RELATED APPLICATION

This application claims priority to U.S. Provisional Application No. 62/852,301, filed on May 23, 2019. The disclosure of the prior application is considered part of and is incorporated by reference in the disclosure of this application.

BACKGROUND

This specification relates to generating outputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a sequence modeling task, e.g., operates on a source sequence to generate or complete a target sequence, operates on portions of both sequences to complete both sequences, or operates on a target sequence to reconstruct a source sequence.

Because of the way the system is configured, the system may be able to perform both source sequence to target sequence transduction and target sequence to source sequence transduction, i.e., the system may operate as either a unidirectional model from source to target or a bidirectional model from either source to target or target to source, depending on what is in a given network input.

In particular, the system can determine, at each of multiple generation time steps, one or more insertions to make on a partial concatenated sequence that includes the source sequence and the target sequence. That is, the system can determine one or more (insertion location, output element) combinations that represent a particular location in the partial concatenated sequence to insert a particular element.

The subject matter described in this specification can be implemented in particular embodiments so as to realize one or more of the following advantages.

Auto-regressive models have been shown to achieve high-quality of performance on a variety of output generation tasks, e.g., speech recognition, machine translation, image generation, and so on. However, auto-regressive models require a new output to be added to the end of the current input sequence at each of multiple time steps. The described techniques, on the other hand, allow for new outputs to be added at arbitrary positions within the current input sequence and, in some cases, multiple outputs to be added at multiple different positions at a single time step. Furthermore, by operating on partial concatenated sequences that include source sequences and target sequences, the described techniques allow for completing both incomplete source sequences and incomplete target sequences in the same partial concatenated sequence.

When only a single output is added at each time step, the additional flexibility afforded to the neural network to select the position at which the single output is added improves performance over conventional auto-regressive models without increasing the number of generation time steps required. When multiple outputs can be added at each time step, because the number of generation time steps for which processing is required to be performed is reduced, the described techniques allow for outputs to be generated much more quickly (and while using fewer computational resources) than outputs generated by auto-regressive models without a significant decrease (and, in some cases, with an increase) in output generation quality. Furthermore, unlike some existing masked language models, the described techniques do not require the system to know in advance how many elements will be inserted into the final sequence or in what positions the elements will be inserted.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system that performs a sequence modeling task, e.g., operates on a source sequence to generate or complete a target sequence, operates on portions of both sequences to complete both sequences, or operates on a target sequence to reconstruct a source sequence.

For example, the system may be a neural machine translation system. That is, if the network input is a sequence of words in an original language, e.g., a sentence or phrase, the target sequence may be a translation of the network input into a target language, i.e., a sequence of words in the target language that represents the sequence of words in the original language.

As another example, the system may be a speech recognition system. That is, if the network input is a sequence of audio data representing a spoken utterance, the target sequence may be a sequence of graphemes, characters, or words that represents the utterance, i.e., is a transcription of the network input.

As another example, the system may be a natural language processing system. For example, if the network input is a sequence of words in an original language, e.g., a sentence or phrase, the target sequence may be a summary of the network input in the original language, i.e., a sequence that has fewer words than the network input but that retains the essential meaning of the network input. As another example, if the network input is a sequence of words that form a question, the target sequence can be a sequence of words that form an answer to the question.

As another example, the system may be part of a self-supervised representation learning system. For example, the system can receive source sequences and target sequences that both include one or more elements but that are both incomplete, e.g., pairs of sequences in different languages that are both incomplete, and can generate a final concatenated sequence that includes a finalized source sequence and a finalized target sequence. The self-supervised representation learning system can generate the final concatenated sequence for the purpose of extracting information from the paired source and target sequences, e.g., to learn word embeddings.

As another example, the system may be part of a computer-assisted medical diagnosis system. For example, the network input can be a sequence of data from an electronic medical record and the target sequence can be a sequence of predicted treatments.

As another example, the system may be part of an image processing system. For example, the network input can be an image, i.e., a sequence of color values from the image, and the output can be a sequence of text that describes the image. As another example, the network input can be a sequence of text or a different context and the network output can be an image that describes the context.

Figure 1:
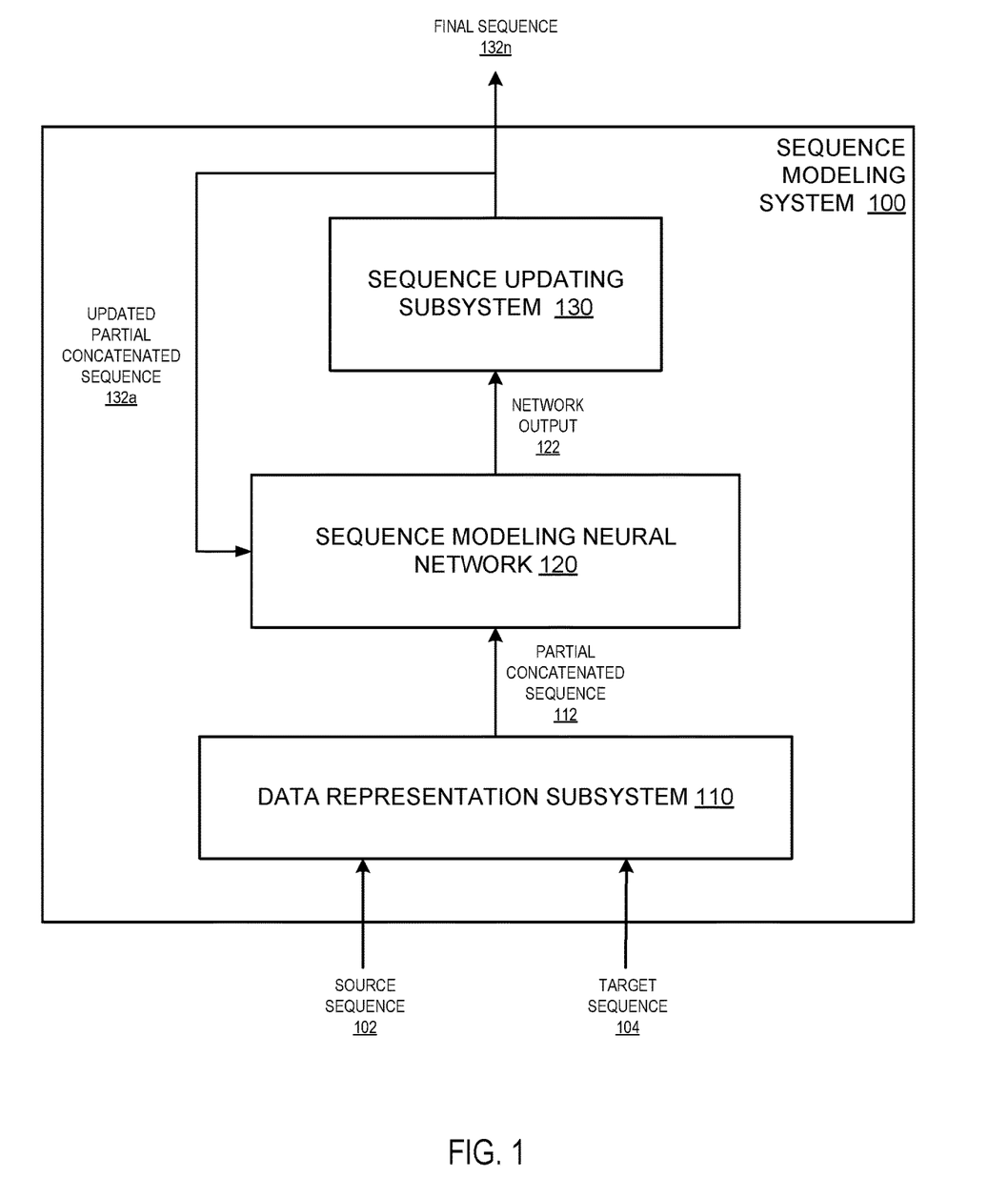
FIG. 1 is a diagram of an example sequence modeling system.

FIG. 1 is a diagram of an example sequence modeling system 100. The sequence modeling system 100 is an example of a system implemented as computer programs on one or more computers in one or more locations, in which the systems, components, and techniques described below can be implemented.

The sequence modeling system 100 receives as input a source sequence 102 that includes one or more source elements and a target sequence 104 that includes zero or more target elements. Each source element in the source sequence 102 is selected from a vocabulary of source elements and each target element in the target sequence is selected from a vocabulary of target elements. In some cases, the vocabulary of source elements and the vocabulary of target elements can be the same; for example, they may both be a vocabulary of subwords that are shared between a source language and a target language. In some other cases, the vocabulary of source elements and the vocabulary of target elements can be different vocabularies; for example, they may be vocabularies of subwords or words that are not shared between a respective source language and target language.

The sequence modeling system 100 processes the source sequence 102 and the target sequence 104 to generate a final concatenated sequence 132$n$ that includes i) each source element from the source sequence 102, ii) each target element from the target sequence 104, and iii) one or more additional source elements and/or one or more additional target elements. That is, the final concatenated sequence 132$n$ includes a finalized source sequence and a finalized target sequence, where one or both of the finalized sequences includes one or more additional respective elements.

In some cases, the target sequence 104 might be empty; that is, given the source sequence 102, the sequence modeling system 100 generates the entire target sequence within the final concatenated sequence 132$n$. In some other cases, the source sequence 102 might be empty; that is, given the target sequence 104, the sequence modeling system 100 reconstructs the entire source sequence 102 within the final concatenated sequence 132$n$. In some other cases, one or both of the source sequence 102 or the target sequence 104 is missing one or more respective elements, which the sequence modelling system 100 inserts into the corresponding location in the final concatenated sequence 132$n$.

The finalized source sequence and the finalized target sequence both include one or more respective elements. That is, if the target sequence 104 includes zero target elements, then the sequence modeling system 100 inserts one or more target elements into the target sequence 104 so that the finalized target sequence includes one or more target elements.

The sequence modeling system 100 includes a data representation subsystem 110 that receives the source sequence 102 and the target sequence 104 and combines the sequences 102 and 104 to generate a partial concatenated sequence 112. That is, the partial concatenated sequence 112 includes the one or more source elements from the source sequence 102 and the zero or more target elements from the target sequence 104, arranged according to a particular combined order of the source elements and the target elements.

For example, the data representation subsystem 110 might generate a partial concatenated sequence 112 that has the following form:

[$S_1$] [$S_2$] ... [$S_n$] [SEP] [$T_1$] [$T_2$] ... [$T_m$], where $S_1$ through $S_n$ are the n source elements in the source sequence 102, $T_1$ through $T_m$ are the m target elements in the target sequence 104, and [SEP] is a designated separator element demarcating the two sequences. As a particular example, the source sequence 102 might be a paragraph and the target sequence 104 might be a fill-in-the-blank question about the paragraph in the form of a declarative sentence with a gap that is to be filled in; e.g., the source sequence 102 might represent a paragraph describing the life of Madonna and the target sequence 104 might represent a question such as "Madonna was born on ______". In particular, the blank space in the target sequence 104 has been added for clarity of the example, and is not included in the target sequence 104 itself; rather the target sequence might include tokens representing "Madonna was born on". In this example, the final concatenated sequence 132$n$ can include all of the elements of the partial concatenated sequence 112, and one or more target elements inserted into the target sequence in order to answer the question (in this case, target elements representing "Aug. 16, 1958").

The sequence modeling system 100 includes a sequence modeling neural network 120 and a sequence updating subsystem 130 that process the partial concatenated sequence 112 across multiple generation time steps. At each generation time step, the sequence modeling system 100 generates an updated partial concatenated sequence 132$a$. The sequence modeling system 100 outputs the final concatenated sequence 132$n$ after the $n^{th}$ and final generation time step.

At each generation time step, the sequence modeling neural network 120 processes the most recent partial concatenated sequence; that is, in the first generation time step the sequence modeling neural network 120 processes the partial concatenated sequence 112, and in each subsequent generation time step the sequence modeling neural network 120 processes the updated partial concatenated sequence 132$a$ generated in the previous time step.

The sequence modeling neural network 120 generates a network output 122 that defines, for each of multiple insertion locations in the most recent partial concatenated sequence, a respective score distribution over a combined vocabulary. The combined vocabulary includes the vocabulary of source elements and the vocabulary of target elements. That is, for each of the multiple insertion locations in the most recent partial concatenated sequence, the network output 122 defines a score distribution over the elements that can be inserted at the insertion located. This process is discussed in more detail below in reference to FIG. 3.

Each insertion location is a different location in the combined order of the most recent partial concatenated sequence at which there is no element in the partial concatenated sequence. That is, the $i^{th}$ insertion location in the partial concatenated sequence is the location directly after the $i^{th}$ element in the partial concatenated sequence, such that if a new element where inserted into the $i^{th}$ insertion location the new element would be between the $i^{th}$ and $(i+1)^{th}$ element in the most recent partial concatenated sequence. The insertion locations can include the location in the combined order directly before the first element of the partial concatenated sequence, and the location in the combined order directly after the last element of the partial concatenated sequence.

In some implementations, the sequence modeling neural network 120 is an attention-based sequence modeling neural network that applies self-attention over the most recent partial concatenated sequence. For example, the sequence modeling neural network 120 may include a decoder stack of a Transformer neural network. Such a neural network is described in International Application No. PCT/US2018/034224, the entire contents of which are hereby incorporated by reference herein in their entirety. Techniques for selecting insertion locations and elements at each of the selected locations are described in more detail in U.S. Application Ser. No. 62/796,038, the entire contents of which are hereby incorporated by reference herein in their entirety.

In some other implementations, the neural network is a different type of neural network that maps network inputs to network outputs. For example, the neural network can be a convolutional neural network that receives as input the most recent partial concatenated sequence and generates the network output.

The sequence updating subsystem 130 receives the network output 122 generated by the sequence modeling neural network 120 and generates a new updated partial concatenated sequence 132a. The sequence updating subsystem 130 selects one or more insertion locations identified the in network output 122 and, for each selected insertion location, an inserted element from the combined vocabulary. The sequence updating subsystem 130 updates the partial concatenated sequence to include, for each selected insertion location, the inserted element selected for the selected insertion location, inserted at the corresponding new location in the combined order of the partial concatenated sequence.

In some implementations, the sequence updating subsystem 130 can select a single insertion location and a single element from the combined vocabulary, and insert the selected element into the selected insertion location to generate the updated partial concatenated sequence 132a. In some other implementations, the sequence updating subsystem 130 can select multiple insertion locations and a respective element from the combined vocabulary for each of the multiple selected insertion location. This process is discussed in more detail below in reference to FIG. 3.

The sequence updating subsystem 130 can determine whether to continue the sequence generation process or whether the current generation time step is the final generation time step. That is, the sequence updating subsystem 130 can determine whether to provide the updated partial concatenated sequence 132a to the sequence modeling neural network 120 or to output the updated partial sequence as the final concatenated sequence 132n. In some implementations, the sequence modeling subsystem 130 determines whether the sequence modeling subsystem 130 selected an end-of-sequence token during the current generation time step. If so, the sequence modeling subsystem 130 can output the updated partial concatenated sequence as the final concatenated sequence 132n; if not, the sequence modeling subsystem 130 proceeds to the next generation time step by providing the updated partial concatenated sequence 132a to the sequence modeling neural network 120. That is, if in the current generation time step the sequence updating subsystem 130 generated the end-of-sequence token while generating the updated partial concatenated sequence, then the sequence updating subsystem 130 can determine to end the process.

Figure 2:
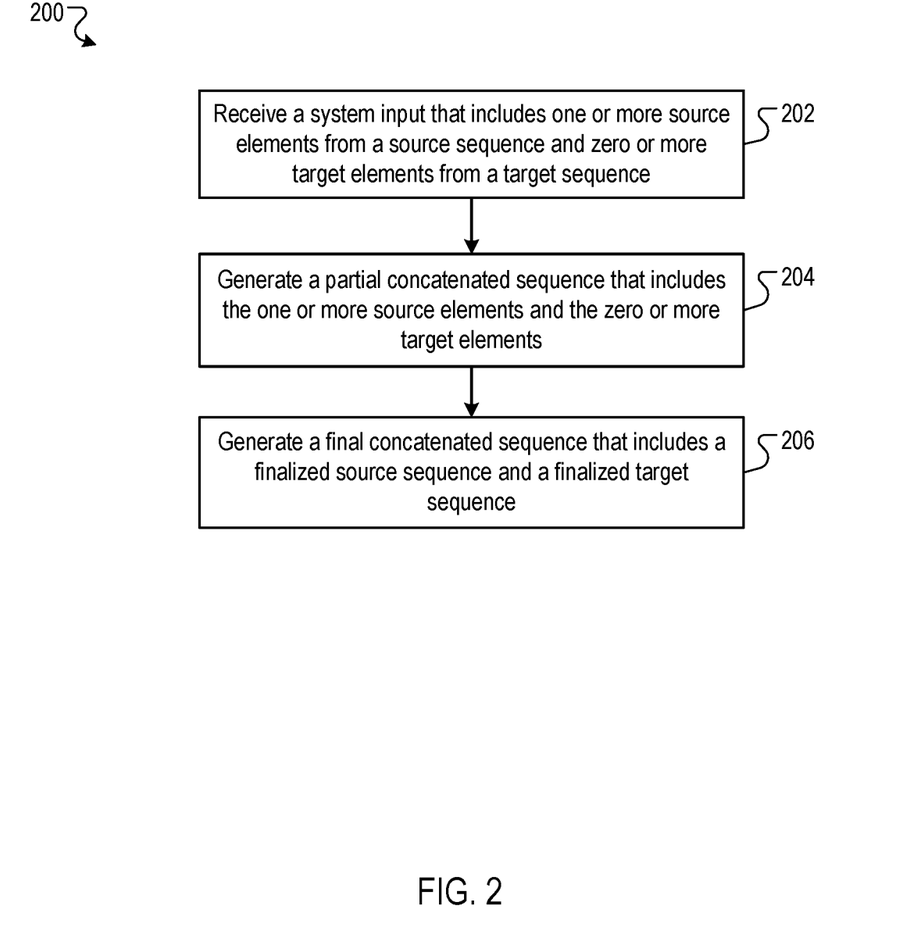
FIG. 2 is a flow diagram of an example process for generating a final concatenated sequence.

FIG. 2 is a flow diagram of an example process 200 for generating a final concatenated sequence. For convenience, the process 200 will be described as being performed by a system of one or more computers located in one or more locations. For example, a sequence modeling system, e.g., the sequence modeling system 100 depicted in FIG. 1, appropriately programmed in accordance with this specification, can perform the process 200.

The system receives a system input that includes one or more source elements from a source sequence and zero or more target elements from a target sequence (step 202). Each source element in the source sequence is selected from a vocabulary of source elements and each target element in the target sequence is selected from a vocabulary of target elements.

In some cases, the system input can include the finalized source sequence and zero elements of the target sequence. In some other cases, the system input can include less than all elements from the finalized source sequence and less than all elements from the finalized target sequence.

The system generates a partial concatenated sequence that includes the one or more source elements from the source sequence and the zero or more target elements from the target sequence (step 204). The source elements and the target elements are arranged in the partial concatenated sequence according to a combined order. In some implementations, the source elements and the target elements are separated in the concatenated sequence by a designated separate element, e.g., [SEP].

The system generates a final concatenated sequence that includes a finalized source sequence and a finalized target sequence (step 206). That is, the final concatenated sequence includes i) the one or more source elements from the source sequence, ii) the zero or more target elements from the target sequence, and iii) one or more additional source elements and/or one or more additional target elements. The system can generate the final concatenated sequence by updating the partial concatenated sequence over multiple generation time steps. This process is described in more detail below in reference to FIG. 3.

Figure 3:
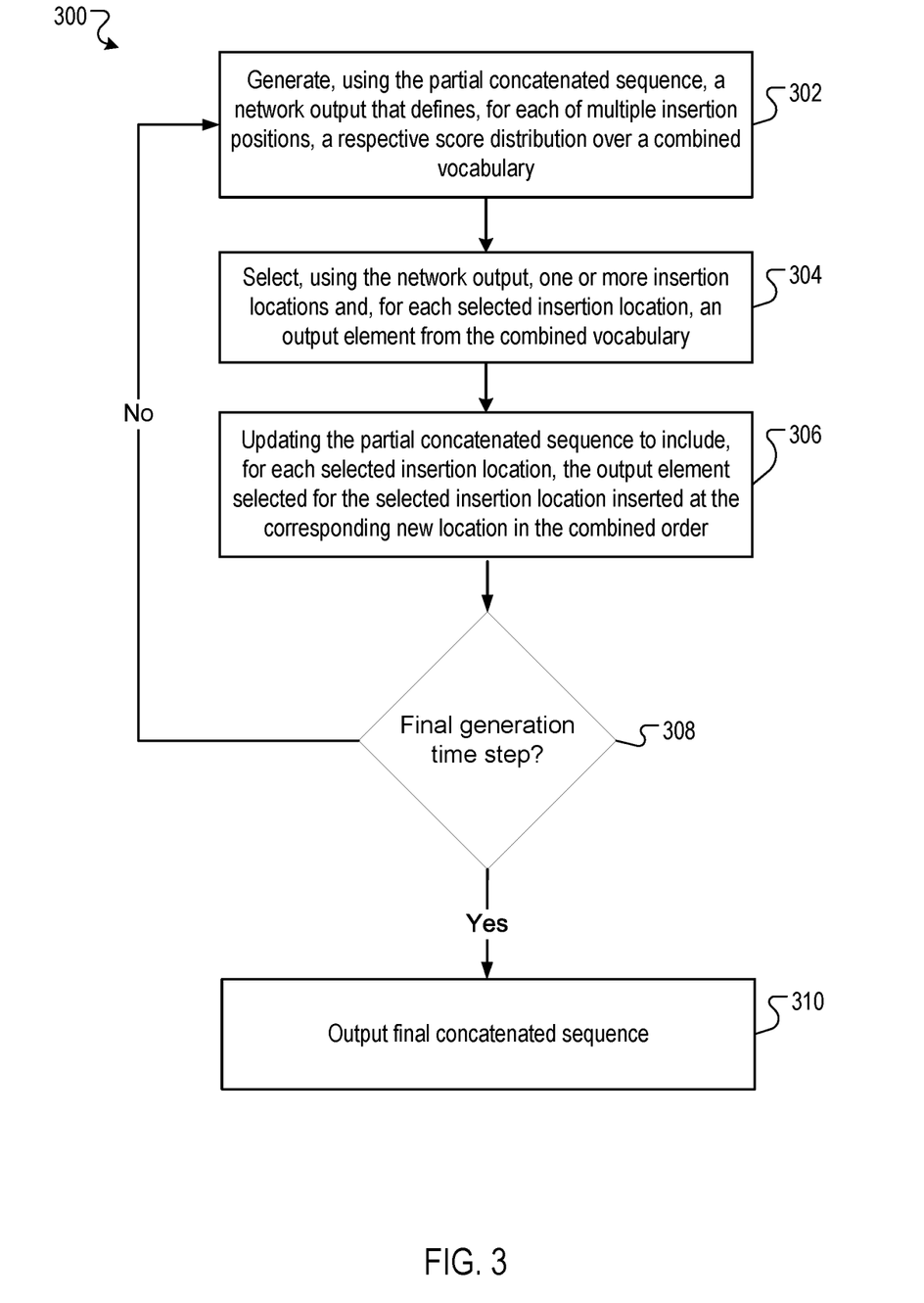
FIG. 3 is a flow diagram of an example process for updating a partial concatenated sequence.

FIG. 3 is a flow diagram of an example process 300 for updating a partial concatenated sequence. For convenience, the process 300 will be described as being performed by a system of one or more computers located in one or more locations. For example, a sequence modeling system, e.g., the sequence modeling system 100 depicted in FIG. 1, appropriately programmed in accordance with this specification, can perform the process 300.

The partial concatenated sequence includes one or more source elements and zero or more target elements arranged in the partial concatenated sequence according to a combined order. The system can perform the process 300 at each of one or more generation time steps in order to generate a final concatenated sequence.

The system generates, using the partial concatenated sequence, a network output that defines, for each of multiple insertion positions, a respective score distribution over a combined vocabulary (step 302). For example, the system can generate the network output using a sequence modeling neural network, e.g., the sequence modeling neural network 120 depicted in FIG. 1. Each insertion location is a different new location in the combined order of the partial concatenated sequence at which there is no element in the partial concatenated sequence.

The combined vocabulary can include a vocabulary of source elements and a vocabulary of target elements. In some cases, the source and target vocabularies are the same vocabulary, and the combined vocabulary is the same as the source and target vocabularies. In some other cases, the source and target vocabularies are different, and the combined vocabulary is a concatenation of the source and target vocabularies. In some implementations, the combined vocabulary includes an end-of-sequence token. The elements of the combined vocabulary are called "output elements."

As a particular example, the sequence modeling neural network can be an attention-based neural network that includes only a single Transformer decoder stack and that processes the partial concatenated sequence to generate the network output. For example, the Transformer decoder stack can generate a network output that has a respective output element corresponding to each insertion location, where the output element corresponding to a particular insertion location represents the score distribution over the combined vocabulary for the particular insertion location.

In some such implementations, none of the attention layers in the Transformer decoder stack in the sequence modeling neural network apply any masking. That is, the Transformer decoder stack has access to the entire partial concatenated sequence at every generation time step, because none of the elements of the partial concatenated sequence are masked from the Transformer decoder stack at any time step.

The score distribution for a particular insertion location characterizes, for each element in the combined vocabulary, a likelihood that the element will be selected to be inserted at the particular insertion location. That is, the network output can include, for each of one or more insertion locations and for each of multiple elements in the combined vocabulary, a respective score that represents a likelihood that the particular element will be placed at the particular insertion location.

In some implementations, the network output includes a respective score distribution over the combined vocabulary for every insertion location in the partial concatenated sequence. In some such implementations, the network output also includes a score distribution over the insertion locations in the partial concatenated sequence.

In some other implementations, the network output includes a respective score distribution over the combined vocabulary for only a subset of the insertion locations in the partial concatenated sequence.

The system selects, using the network output, one or more particular insertion locations and, for each selected insertion location, an output element from the combined vocabulary (step 304). For example, the system can select the particular insertion locations and output elements using a sequence updating subsystem, e.g., the sequence updating subsystem 130 depicted in FIG. 1.

The system can determine a set of first insertion locations from which to select the one or more particular insertion locations. In some implementations, the set of first insertion locations includes every insertion location in the partial concatenated sequence. In some other implementations, the set of first insertion locations includes only a strict subset of the insertion locations in the partial concatenated sequence. For example, in some implementations, the network output includes a score distribution over the insertion locations. In some such implementations, the system can determine the set of first insertion locations to include one or more insertion locations that have the highest score in the score distribution over the insertion locations. For example, the system can determine the set of first insertion locations to include a particular number of insertion locations that have the highest score in the score distribution over insertion locations. As another example, the system can determine the set of first insertion locations to include each insertion location whose score in the score distribution over insertion locations is above a particular threshold.

After selecting the set of first insertion locations, the system can select the one or more particular insertion locations and the corresponding output elements.

In some implementations, the system can determine a particular (insertion location, output element) combination with a highest score in the corresponding distribution over the combined vocabulary, across all (insertion location, output element) combinations in the set of first insertion locations. That is, the system can determine a particular insertion location in the partial concatenated output and a particular output element in the combined vocabulary that has the highest score across all scores in the network output corresponding to the set of first insertion locations. The system can determine that the particular (insertion location, output element) combination does not include the end-of-sequence token; that is, that the selected output element is not the end-of-sequence token. If the selected output element is not the end of sequence token, then the system can select the particular (insertion location, output element) combination. That is, the system can determine to insert a single output element from the combined vocabulary if the highest score in the network output does not correspond to the end-of-sequence token. If the selected output element is the end of sequence token, the system can select the end-of-sequence token, which can correspond to ending the process 300; this process is described in more detail below.

In some other implementations, the system can determine that there is at least one insertion location in the set of first insertion locations for which the output element with the highest score in the corresponding distribution over the combined vocabulary is not the end-of-sequence token. In response, the system can select the (insertion location, output element) combination that has the highest score in the network output for all (insertion location, output element) combinations that include an insertion location in the set of particular insertion locations for which the output element with the highest score is not the end-of-sequence token. That is, the system can determine to insert a single output element from the combined vocabulary into the partial concatenated sequence, if there exists an insertion location in the partial concatenation sequence for which the highest score in the network output does not correspond to the end-of-sequence token. If the system determines that no such insertion location exists (i.e., that the highest score in the network output for every insertion location corresponds to the end-of-sequence token), then the system can select the end-of-sequence token, which can correspond to ending the process 300.

In some other implementations, the system can identify, for each insertion location in the set of first insertion locations, the output element that has the highest score in the corresponding distribution over the combined vocabulary. The system can determine that there is at least one insertion location for which the output element with the highest score is not the end of sequence token and, in response, select each insertion location for which the output element with the highest score is not the end-of-sequence token, and select the corresponding output element that has the highest score for the insertion location. That is, the system can determine to insert one or more output elements from the combined vocabulary into the partial concatenated sequence, including one output element in each insertion location for which the highest score does not correspond to the end-of-sequence token. If the system determines that no such insertion location exists (i.e., that the highest score in the network output for every insertion location corresponds to the end-of-sequence token), then the system can select the end-of-sequence token, which can correspond to ending the process 300.

The system updates the partial concatenated sequence to include, for each selected insertion location, the output element selected for the selected insertion location inserted at the corresponding new location in the combined order of the partial concatenated sequence (step 306). In some implementations, the system only updates the partial concatenated sequence if the system did not select the end-of-sequence token in step 304.

The system determines, using the updated partial concatenated sequence, whether the current generation time step is the final generation time step (step 308). For example, the system can determine whether the system selected the end-of-sequence token in step 304 and, if so, determine that the current generation time step is the final generation time step. If the system determines that the current generation time step is not the final generation time step, then the system can return to step 302 and continue the process 300.

If the system determines that the current generation time step is the final generation time step, then the system outputs the updated partial concatenated sequence as the final concatenated sequence (step 310).

Figure 4:
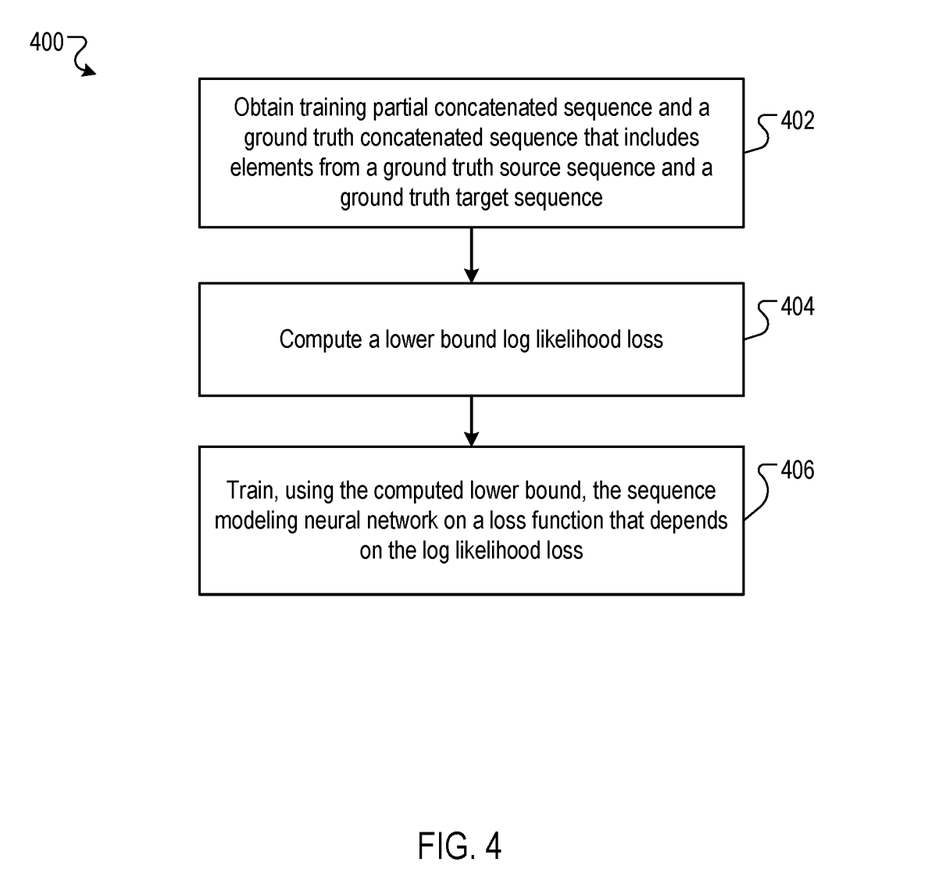
FIG. 4 is a flow diagram of an example process for training a sequence modeling neural network.

FIG. 4 is a flow diagram of an example process 400 for training a sequence modeling neural network. For convenience, the process 300 will be described as being performed by a system of one or more computers located in one or more locations. For example, a training system for a sequence modeling system, e.g., the sequence modeling system 100 depicted in FIG. 1, appropriately programmed in accordance with this specification, can perform the process 300.

The system obtains a training partial concatenated sequence and a ground truth concatenated sequence (step 402). The ground truth concatenated sequence includes multiple elements from a ground truth source sequence and multiple elements from a ground truth target sequence. The ground truth source sequence and the ground truth target sequence corresponds to "true" versions of the finalized source sequence and target sequence, respectively. The ground truth concatenated sequence includes n more elements than the training partial concatenated sequence. That is, the training partial concatenated sequence is "incomplete." For example, the training partial concatenated sequence can correspond to a generation time step that is not the final generation time step.

The system computes a lower bound of a log likelihood loss (step 404).

As a particular example, the system can select a generation index i that is between 1 and n, inclusive. For example, the system can select i randomly, e.g., uniformly at random. As another example, the generation index i can be fixed, e.g., at i=1.

The system can then select a partial permutation of the ordering of the first i−1 insertions required to generate the ground truth concatenated sequence from the training partial concatenated sequence. That is, the system can select an order by which a sequence modeling system might insert the first i elements of the n elements that need to be inserted into the training partial concatenated sequence in order to generate the ground truth concatenated sequence. In some implementations, e.g., in implementations in which the system generates one additional element per generation time step, the system can sample the permutation uniformly at random. In some other implementations, e.g., in implementation in which the system generates multiple additional elements per generation time step, the system can sample the permutation according to a prior that is non-uniform, e.g., a prior defined by a balanced binary tree.

The system can then compute a weighted sum over a set of next-step log losses for outputs required to generate the first i−1 insertions, according to the score distributions generated by the sequence modeling neural network. For example, the system can compute the following:

$$\sum_{z_i} p(z_i \mid z_{1:i-1}) \log p((c_i^z, l_i^z) \mid x_{1:i-1}^{z,i-1}),$$

where $z_i$ is the next insertion location in the selected partial permutation, $z_{1:i-1}$ is the previous i−1 insertion locations in the selected partial permutations, $x_{1:i-1}^{z,i-1}$ is the partial concatenated sequence at time i−1, c is an element from the combined vocabulary, l is an insertion location, $l_i^z$ is the next insertion location according to the selected partial permutation, and $c_i^z$ is the ground-truth output element in the insertion location $l_i^z$. This value represents an unbiased lower bound on the log-likelihood for a single training example, i.e., the log likelihood loss. The $p(z_i|z_{1:i-1})$ term is the probability of selecting the selected partial permutation; e.g., the probability given by a uniform or non-uniform distribution as described in the previous paragraph. The $p((c_i^z, l_i^z)|x_{1:i-1}^{z,i-1})$ term can be given by the output of the sequence modeling neural network, i.e., the value for $c_i^z$ in the generated distribution over the combined vocabulary corresponding to insertion location $l_i^z$ when the sequence modeling neural network processes the partial concatenated sequence $x_{1:i-1}^{z,i-1}$.

The system trains, using the computed estimate of the lower bound of the log likelihood, the sequence modeling neural network on a loss function that depends on the log likelihood loss (step 406). For example, the loss function can be equal to the log likelihood loss, e.g., for a single training example for batched across multiple training examples. As another example, the loss function can be generated according to multiple losses, one of which is the log likelihood loss. The system can train the sequence modeling neural network by backpropagating the loss through each layer of the neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by one or more computers, the method comprising:
  receiving a system input that includes one or more source elements from a source sequence and zero or more target elements from a target sequence, wherein each source element in the source sequence is selected from a vocabulary of source elements and wherein each target element in the target sequence is selected from a vocabulary of target elements;
  generating a partial concatenated sequence that includes the one or more source elements from the source sequence and the zero or more target elements from the target sequence, wherein the source and target elements arranged in the partial concatenated sequence according to a combined order; and
  generating a final concatenated sequence that includes a finalized source sequence and a finalized target sequence, wherein the finalized target sequence includes one or more target elements, and wherein the generating comprises, at each of a plurality of generation time steps:
    generating, using a sequence modeling neural network conditioned on the partial concatenated sequence, a network output that defines, for each of a plurality of insertion locations, a respective score distribution over a combined vocabulary that includes source elements and target elements, wherein each insertion location is a different new location in the combined order at which there is no element in the partial concatenated sequence;
    selecting, using the network output, one or more of the insertion locations and, for each selected insertion location, a first element from the combined vocabulary; and
    updating the partial concatenated sequence to include, for each selected insertion location, the first element selected for the selected insertion location inserted at the corresponding new location in the combined order.

Embodiment 2 is the method of embodiment 1, wherein the system input includes the finalized source sequence and zero elements from the target sequence.

Embodiment 3 is the method of embodiment 1, wherein the system input includes less than all of the elements from the finalized source sequence and less than all of the elements from the finalized target sequence.

Embodiment 4 is the method of any one of embodiments 1-3, wherein the source and target vocabularies are the same and wherein the combined vocabulary is the same as the source and target vocabularies.

Embodiment 5 is the method of any one of embodiments 1-3, wherein the source and target vocabularies are different and wherein the combined vocabulary is a concatenation of the source and target vocabularies.

Embodiment 6 is the method of any one of embodiments 1-5, wherein the sequence modeling neural network is an attention-based neural network that includes only a single Transformer encoder stack and that processes the partial concatenated sequence to generate the network output.

Embodiment 7 is the method of embodiment 6, wherein none of the attention layers in the sequence modeling neural network apply any masking.

Embodiment 8 is the method of any one of embodiments 1-7, wherein the source and target elements are separated in the partial concatenated sequence by a designated separator element.

Embodiment 9 is the method of any one of embodiments 1-8, wherein the network output includes a score distribution over insertion locations and, for each insertion location, a respective score distribution over the combined vocabulary.

Embodiment 10 is the method of any one of embodiments 1-9, wherein the combined vocabulary includes an end-of-sequence token.

Embodiment 11 is the method of embodiment 10, wherein selecting, using the network output, one or more of the insertion locations and, for each selected insertion location, an inserted output from the vocabulary comprises:
  determining that an insertion location—output element combination with a highest score across all insertion location—output element combinations does not include the end-of-sequence token; and
  in response, selecting only the insertion location—output element combination with a highest score across all insertion location—output element combinations.

Embodiment 12 is the method of embodiment 10, wherein selecting, using the network output, one or more of the insertion locations and, for each selected insertion location, an inserted output from the vocabulary comprises:
  determining that there is at least one insertion location for which the output element with the highest score is not the end-of-sequence token; and in response, selecting only an insertion location—output element combination with a highest score across all insertion location—output element combinations that include an insertion location for which the output element with the highest score is not the end-of-sequence token.

Embodiment 13 is the method of embodiment 10, wherein selecting, using the network output, one or more of the insertion locations and, for each selected insertion location, an inserted output from the vocabulary comprises:
  identifying, from the network output and for each insertion location, an output element that has a highest probability for the insertion location;
  determining that there is at least one insertion location for which the output element with the highest probability is not the end-of-sequence token; and
  in response, selecting each insertion location for which the output element with the highest probability is not the end-of-sequence token and the corresponding output element that has the highest probability for the insertion location.

Embodiment 14 is a method of training a sequence modeling neural network, the method comprising:
  obtaining a training partial concatenated sequence and a ground truth concatenated sequence that includes a plurality of elements from a ground truth source sequence and a plurality of elements from a ground truth target sequence, the concatenated sequence including n more elements than the training partial concatenated sequence;
  computing a lower bound of a log likelihood loss, comprising:
    selecting a generation index i that is between one and n, inclusive;
    selecting a partial permutation of the ordering of the first i−1 insertions required to generate the ground truth concatenated sequence from the training partial concatenated sequence; and
    computing a weighted sum over a set of next-step log losses for outputs required to generate the first i−1 insertions according to the partial permutation according to the score distributions generated by the sequence modeling neural network;
  training, using the lower bound, the sequence modeling neural network on a loss function that depends on the log likelihood loss.

Embodiment 15 is the method of embodiment 14, wherein the neural network generates one additional element per generation time step and selecting a partial permutation comprises randomly selecting the partial permutation.

Embodiment 16 is the method of embodiment 14, wherein the neural network generates more than one additional element in at least some generation time steps and selecting a partial permutation comprises selecting the partial permutation according to a prior that is non-uniform.

Embodiment 17 is the method of any one of embodiments 14-16, wherein selecting the generation index i comprises sampling the generation index randomly from the set of values between one and n, inclusive.

Embodiment 18 is a system comprising: one or more computers and one or more storage devices storing instructions that are operable, when executed by the one or more computers, to cause the one or more computers to perform the method of any one of embodiments 1 to 17.

Embodiment 19 is a computer storage medium encoded with a computer program, the program comprising instructions that are operable, when executed by data processing apparatus, to cause the data processing apparatus to perform the method of any one of embodiments 1 to 17.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
  receiving a system input for a natural language processing task, wherein the system input includes one or more source elements from a source sequence for the natural language processing task and zero or more target elements from a target sequence for the natural language processing task, wherein each source element in the source sequence is selected from a vocabulary of source elements and wherein each target element in the target sequence is selected from a vocabulary of target elements, wherein the target elements are from a vocabulary for a target language for the natural language processing task and the source elements are from a vocabulary for a source language for the natural language processing task;
  generating a partial concatenated sequence that includes the one or more source elements from the source sequence and the zero or more target elements from the target sequence, wherein the source and target elements are arranged in the partial concatenated sequence according to a combined order; and
  generating a final concatenated sequence that includes a finalized source sequence and a finalized target sequence, wherein the finalized target sequence includes one or more target elements, and wherein the generating comprises, at each of a plurality of generation time steps:
  generating, using a sequence modeling neural network conditioned on the partial concatenated sequence, a network output that defines, for each of a plurality of insertion locations, a respective score distribution over a combined vocabulary that includes source elements and target elements, wherein each insertion location is a different new location in the combined order at which there is no element in the partial concatenated sequence;
  selecting, using the network output, one or more of the insertion locations and, for each selected insertion location, a first element from the combined vocabulary; and
  updating the partial concatenated sequence to include, for each selected insertion location, the first element selected for the selected insertion location inserted at the corresponding new location in the combined order.

2. The method of claim 1, wherein the system input includes the finalized source sequence and zero elements from the target sequence.

3. The method of claim 1, wherein the system input includes less than all of the elements from the finalized source sequence and less than all of the elements from the finalized target sequence.

4. The method of claim 1, wherein the source and target vocabularies are the same and wherein the combined vocabulary is the same as the source and target vocabularies.

5. The method of claim 1, wherein the source and target vocabularies are different and wherein the combined vocabulary is a concatenation of the source and target vocabularies.

6. The method of claim 1, wherein the sequence modeling neural network is an attention-based neural network that includes only a single Transformer decoder stack and that processes the partial concatenated sequence to generate the network output.

7. The method of claim 6, wherein none of the attention layers in the sequence modeling neural network apply any masking.

8. The method of claim 1, wherein the source and target elements are separated in the partial concatenated sequence by a designated separator element.

9. The method of claim 1,
  wherein the network output includes a score distribution over insertion locations and, for each insertion location, a respective score distribution over the combined vocabulary.

10. The method of claim 1, wherein the combined vocabulary includes an end-of-sequence token.

11. The method of claim 10, wherein selecting, using the network output, one or more of the insertion locations and, for each selected insertion location, an inserted output from the vocabulary comprises:
  determining that an insertion location—output element combination with a highest score across all insertion location—output element combinations does not include the end-of-sequence token; and
  in response, selecting only the insertion location—output element combination with a highest score across all insertion location—output element combinations.

12. The method of claim 10, wherein selecting, using the network output, one or more of the insertion locations and, for each selected insertion location, an inserted output from the vocabulary comprises:
  determining that there is at least one insertion location for which the output element with the highest score is not the end-of-sequence token; and
  in response, selecting only an insertion location—output element combination with a highest score across all insertion location—output element combinations that include an insertion location for which the output element with the highest score is not the end-of-sequence token.

13. The method of claim 10, wherein selecting, using the network output, one or more of the insertion locations and, for each selected insertion location, an inserted output from the vocabulary comprises:
  identifying, from the network output and for each insertion location, an output element that has a highest probability for the insertion location;
  determining that there is at least one insertion location for which the output element with the highest probability is not the end-of-sequence token; and
  in response, selecting each insertion location for which the output element with the highest probability is not the end-of-sequence token and the corresponding output element that has the highest probability for the insertion location.

14. A method of training a sequence modeling neural network to perform a natural language processing task, the method comprising:
  obtaining a training partial concatenated sequence and a ground truth concatenated sequence that includes a plurality of elements from a ground truth source sequence for the natural language processing task and a plurality of elements from a ground truth target sequence for the natural language processing task, the concatenated sequence including n more elements than the training partial concatenated sequence;
  computing a lower bound of a log likelihood loss, comprising:
    selecting a generation index i that is between one and n, inclusive;
    selecting a partial permutation of the ordering of the first 1-1 insertions required to generate the ground truth concatenated sequence from the training partial concatenated sequence; and
    computing a weighted sum over a set of next-step log losses for outputs required to generate the first 1-1 insertions according to the partial permutation according to score distributions generated by the sequence modeling neural network; and
  training, using the lower bound, the sequence modeling neural network on a loss function that depends on the log likelihood loss.

15. The method of claim 14, wherein the sequence modeling neural network generates one additional element per generation time step and selecting a partial permutation comprises randomly selecting the partial permutation.

16. The method of claim 14, wherein the sequence modeling neural network generates more than one additional element in at least some generation time steps and selecting a partial permutation comprises selecting the partial permutation according to a prior that is non-uniform.

17. The method of claim 14, wherein selecting the generation index i comprises sampling the generation index randomly from the set of values between one and n, inclusive.

18. A system comprising one or more computers and one or more storage devices storing instructions that are operable, when executed by the one or more computers, to cause the one or more computers to perform operations comprising:
receiving a system input for a natural language processing task, wherein the system input includes one or more source elements from a source sequence for the natural language processing task and zero or more target elements from a target sequence for the natural language processing task, wherein each source element in the source sequence is selected from a vocabulary of source elements and wherein each target element in the target sequence is selected from a vocabulary of target elements, wherein the target elements are from a vocabulary for a target language for the natural language processing task and the source elements are from a vocabulary for a source language for the natural language processing task;
generating a partial concatenated sequence that includes the one or more source elements from the source sequence and the zero or more target elements from the target sequence, wherein the source and target elements are arranged in the partial concatenated sequence according to a combined order; and
generating a final concatenated sequence that includes a finalized source sequence and a finalized target sequence, wherein the finalized target sequence includes one or more target elements, and wherein the generating comprises, at each of a plurality of generation time steps:
generating, using a sequence modeling neural network conditioned on the partial concatenated sequence, a network output that defines, for each of a plurality of insertion locations, a respective score distribution over a combined vocabulary that includes source elements and target elements, wherein each insertion location is a different new location in the combined order at which there is no element in the partial concatenated sequence;
selecting, using the network output, one or more of the insertion locations and, for each selected insertion location, a first element from the combined vocabulary; and
updating the partial concatenated sequence to include, for each selected insertion location, the first element selected for the selected insertion location inserted at the corresponding new location in the combined order.

19. The system of claim 18, wherein the system input includes the finalized source sequence and zero elements from the target sequence.

20. The system of claim 18, wherein the system input includes less than all of the elements from the finalized source sequence and less than all of the elements from the finalized target sequence.

21. The method of claim 1, wherein the source language and the target language are the same.

22. The method of claim 1, wherein the natural language processing task is one of:
a neural machine translation task for translating from the source language to the target language;
a task that requires generating a target sequence that is a summary of the source sequence;
a task that requires generating a target sequence that answers a question formed by the source sequence; or
a task that requires completing a partial source text sequence, a partial target sequence, or both.

23. The system of claim 18, wherein the source language and the target language are the same.

24. The system of claim 18, wherein the natural language processing task is one of:
a neural machine translation task for translating from the source language to the target language;
a task that requires generating a target sequence that is a summary of the source sequence;
a task that requires generating a target sequence that answers a question formed by the source sequence; or
a task that requires completing a partial source text sequence, a partial target sequence, or both.

* * * * *